(12) United States Patent
Heitplatz et al.

(10) Patent No.: US 11,787,640 B2
(45) Date of Patent: Oct. 17, 2023

(54) FLOOR-BOUND CONTINUOUS CONVEYOR

(71) Applicant: Swisslog GmbH, Dortmund (DE)

(72) Inventors: Heino Heitplatz, Drensteinfurt (DE); Dennis Gebhardt, Dortmund (DE)

(73) Assignee: Swisslog AG, Buchs (CH)

( * ) Notice: Subject to any disclaimer, the term of this patent is extended or adjusted under 35 U.S.C. 154(b) by 85 days.

(21) Appl. No.: 17/389,481

(22) Filed: Jul. 30, 2021

(65) Prior Publication Data

US 2022/0033189 A1 Feb. 3, 2022

Related U.S. Application Data

(63) Continuation-in-part of application No. PCT/EP2020/071739, filed on Jul. 31, 2020.

(51) Int. Cl.
*B65G 41/00* (2006.01)
*B65G 13/11* (2006.01)

(52) U.S. Cl.
CPC ............ *B65G 41/001* (2013.01); *B65G 13/11* (2013.01); *B65G 2203/0233* (2013.01)

(58) Field of Classification Search
None
See application file for complete search history.

(56) References Cited

U.S. PATENT DOCUMENTS 4,776,742 A * 10/1988 Felder ................... B65G 59/08
414/416.09
6,098,783 A * 8/2000 Erlandson .............. B65G 65/23
198/413

FOREIGN PATENT DOCUMENTS

DE 102012025163 A1 6/2014
EP 3003918 A1 4/2016

* cited by examiner

*Primary Examiner* — Kavel Singh
(74) *Attorney, Agent, or Firm* — Dorton & Willis, LLP

(57) ABSTRACT

A floor-bound continuous conveyor for intralogistics includes at least one frame and at least one load-carrying means which has a conveying plane for piece goods and which is configured to transport the piece goods in a conveying direction. A stop means is configured to stop an item of piece goods transported on the conveying plane in the conveying direction at a predetermined position on the load-carrying means. A movement apparatus is designed to move the item of piece goods resting against the stop means on the conveying plane from the starting position and orientation thereof standing on the conveying plane of the load handling device into an end position and orientation deviating from the starting position and orientation on the load-carrying means out of the conveying plane of the load-carrying means into the end position and orientation.

16 Claims, 11 Drawing Sheets

FLOOR-BOUND CONTINUOUS CONVEYOR

CROSS-REFERENCE TO RELATED APPLICATIONS

This application is a continuation-in-part application under 35 U.S.C. § 111 (a) and 37 C.F.R. § 1.53(b) of International Patent Application No. PCT/EP2020/071739, filed Jul. 31, 2020 (pending), the disclosure of which is incorporated by reference herein in its entirety.

TECHNICAL FIELD

The invention relates to a floor-bound continuous conveyor for intralogistics, comprising at least one frame and at least one load-carrying means which has a conveying plane for piece goods and which is designed to transport the piece goods in a conveying direction.

BACKGROUND

DE 10 2012 025 163 A1 describes an apparatus for picking goods from source containers, consisting of a picking island, which is connected via a transport apparatus to a warehouse having a large number of storage spaces for storing and removing the source containers, the picking island consisting of at least one picking device with longitudinal conveyors working in at least two planes, which convey the source containers to be picked to the work surface of a picking device and remove them again after picking has been carried out. When the source container has been transferred to a second longitudinal conveyor, it comes into the region of a tilting conveyor, which in turn has a further longitudinal conveyor that is pivotably mounted on a front end in a horizontal pivot axis.

EP 3 003 918 A1 describes a storage and/or order-picking system in which a plurality of handling devices are located along the transport track between the transport track and the workplace, and the handling devices each have a tray holder for at least one tray, each tray holder being arranged so as to be pivotable from a horizontal loading position, in which the tray holder can be coupled to the transport track for transferring trays, into an access position spaced horizontally from the loading position, the pivoting movement running perpendicular to the conveying direction of the transport track, and the tray holder being inclined in the access position pointing away from the loading position.

SUMMARY

The object of the invention is to create a floor-bound continuous conveyor in which piece goods transported on a load-carrying means can be provided to a user in an ergonomically advantageous manner, the continuous conveyor being simple and space-saving.

The inventive object is achieved by a floor-bound continuous conveyor and a system with as described herein.

One aspect relates to a floor-bound continuous conveyor for intralogistics, comprising at least one frame and at least one load-carrying means which has a conveying plane for piece goods and which is designed to transport the piece goods in a conveying direction, characterized by a stop means which is designed to stop an item of piece goods transported on the conveying plane in the conveying direction at a predetermined position on the load-carrying means, and characterized by a movement apparatus which is designed to move the item of piece goods resting against the stop means on the conveying plane from the starting position and orientation thereof standing on the conveying plane of the load handling device into an end position and orientation deviating from the starting position and orientation on the load-carrying means out of the conveying plane of the load-carrying means into the end position and orientation.

The floor-bound continuous conveyor can have at least one roller conveyor, one belt conveyor, one chain conveyor, one vibratory conveyor and/or one chute, the conveying plane being arranged at least substantially horizontally or so as to be inclined at an angle of up to approximately 15 degrees from the horizontal. The belt conveyor can be, for example, a belt conveyor, a segment belt conveyor, an apron belt conveyor, or a link belt conveyor. The invention is described below primarily using the example of a roller conveyor having a plurality of rotatably mounted rollers. It is within the scope of the invention that, in all of the embodiment variants described, said roller track or roller conveyor can be replaced by one of the above-mentioned other types of floor-bound continuous conveyors. Instead of rollers, in such designs, depending on the type of special floor-bound continuous conveyor, the rollers can be replaced by belts, straps, segments, plates or links. The respective rollers, belts, straps, segments, plates or links of the special type of continuous conveyor then form the load-carrying means. The load-carrying means can in particular also comprise an active load-carrying means which has at least one (own) drive. In particular, a drive can be assigned to one or more rollers, or one or more rollers can have their own drive. For example, the drive can be arranged in the roller body. Further examples of an active load-carrying means are telescopic forks and belt conveyors. The load-carrying means can also be designed to be passive, for example as a gravity conveyor, in which the load is displaced following gravity.

The object is achieved in a special embodiment by a conveyance-automated roller track, comprising at least one frame and a plurality of rollers rotatably mounted on the frame and arranged side-by-side at a distance from one another, which form a conveying plane for piece goods, the conveying direction of which runs at least substantially transversely relative to the axis of rotation of the rollers (i.e. about the X-axis, see for example FIG. 1), and comprising a stop means which is designed to hold an item of piece goods transported on the conveying plane in the conveying direction at a predetermined position on the roller track, and a movement apparatus, in particular tilting apparatus as preferred movement apparatus, which is designed to move or tilt or incline the item of piece goods resting against the stop means on the conveying plane from the starting position and orientation thereof standing on the conveying plane into an end position and orientation deviating from the starting position and orientation out of the conveying plane of the roller track.

The tilting or inclining process is preferably started automatically as soon as the item of piece goods comes into mechanical contact with the stop means or reaches the stop position. To detect the position of the item of piece goods on the stop means or the stop position, at least one sensor can be provided which detects the presence of the item of piece goods or the contact of the item of piece goods with the stop means. Alternatively or additionally, a position sensor can be provided which detects the positioning of the item of piece goods in front of the stop means, in particular without having to detect a mechanical contact between the stop means and the item of piece goods. The at least one sensor can be connected to a controller of the continuous conveyor so that the controller can automatically cause the item of piece goods to tilt or incline by means of the movement apparatus as soon as the item is in the position provided for it. As a result, it is advantageously no longer necessary for a user to initiate the tilting or inclining manually, for example by pressing the button on an operating element of the continuous conveyor. Rather, this advantageously takes place automatically for each item of piece goods using the controller.

In connection with the invention, a roller track is understood to mean a conveyance-automated device which, in the sense of conveyor technology, represents a conveying means for conveying piece goods. The roller track is therefore part of an internal transport system and belongs to the type of continuous conveyor. In this respect, the roller track is a stationary system and is primarily used to transport goods via an arrangement of rotatably mounted rollers. Roller tracks can be used for sorting, distributing, storing and, in particular, picking piece goods.

The piece goods can be of any type. The piece goods can be, for example, packages, trays, containers, pallets, but also individual goods or workpieces. However, the invention is particularly expedient in connection with transport containers which are either designed to be open at the top or are closed, for example, by means of a lid, and which are configured to receive or temporarily store one or more other items of piece goods or goods. For example, the item of piece goods transported on the roller track can be a transport container or order-picking container in which a specific, distinct item of piece goods is stored and, for example, is delivered to an order-picking station. Preferably, precisely one roller track can be provided which transports the item of piece goods to a person at an order-picking station and also away from the person again. The feed and discharge can be done using the same conveyor technology.

Especially at a goods-to-person order-picking station, a transport container or order-picking container should be provided in such a way that the person who, for example, is processing orders in the warehouse of a department store, can remove the provided goods from the picking container in a particularly ergonomic manner. For this purpose, it is expedient to tilt the upper opening of the transport container or the order-picking container out of the horizontal plane thereof, specifically in the direction of the person, so that the person can more easily look and/or reach into the transport container or the order-picking container. Accordingly, the item of piece goods is inclined or tilted by an angle of approximately 10 degrees to approximately 80 degrees, preferably by an angle of approximately 15 degrees to approximately 45 degrees.

The frame forms a stationary substructure, which serves as a carrier and bearing for the rotatably mounted rollers. The frame can preferably be designed to be stationary, i.e. rigidly connected to a ground. However, the frame can optionally also be movable within the scope of an extensive conveyor system, i.e. adjustable, for example pivotable in a substantially horizontal plane or adjustable in a vertical direction in different gradients but is not movable within the space by using rollers instead of feet.

The term "floor-bound continuous conveyor" means in particular that, as "floor-bound conveyor," it is able to transport the goods to be transported horizontally, in an inclined manner, and vertically. Floor-bound conveyors often require a lot of floor space and have a fixed transport route. Furthermore, they are suitable as "continuous conveyors" for the transport of large quantities of material or continuously required materials on fixed sections, whereby loading and unloading can preferably take place at a plurality of points along the transport path. They are constantly, i.e. permanently or continuously, in motion, in contrast to the discontinuous conveyors, which move the transported goods in individual cycles.

The rotatably mounted rollers, which are arranged side-by-side at a distance from one another, can either be designed to be actively driven or be designed to be non-driven, i.e. freely rotating. The item of piece goods is supported on the rollers during their transport on the roller track, i.e. the item of piece goods is supported on a number of rollers, depending on the size thereof, i.e. the base surface thereof. When the rollers turn, the item of piece goods is moved and transported along the conveying direction on the roller track. The piece goods can, for example in the case of non-driven rollers, move by means of the influence of gravity, in particular when the conveying plane is arranged to be inclined in relation to the horizontal plane in the conveying direction. As an alternative or in addition, the rollers can be designed to be driven and thereby actively drive the item of piece goods in the conveying direction and thus move it.

The conveying plane is determined by the supporting contact lines on the outer surfaces of the rollers, on which the item of piece goods is supported with the base surface thereof. The conveying plane generally extends substantially in the horizontal plane, unless the conveying plane is arranged to be inclined in the desired manner, for example in order to allow conveying by means of the influence of gravity.

The conveying direction is determined by the alignment of the axes of rotation of the rollers and the direction of rotation of the rollers. The conveying direction generally runs along a straight path but can also follow along a curved path. In addition, the conveying direction generally lies in an at least substantially horizontal plane but can also lie in an inclined plane. The conveying direction determines in which direction the transported piece goods are moved. The conveying direction runs transversely to the axis of rotation of the rollers.

The stop means can preferably lie in the region of an end section portion, i.e. at the end of a roller track section. The roller track can, for example, result in a local picking station, the roller track ending at the order-picking station. Such a roller track is generally used to bring the goods held in a transport container, in particular a special type of goods or group of goods that is transported from a storage region by means of the roller track, to the order-picking station. Each transport container brought in accordingly forms a source container from which, for example, a person who, for example, processes orders in the warehouse of a department store, removes a specific number of the provided goods and, for example, transfers them to a target container in which the mixed goods are put together according to the order.

However, the stop means does not necessarily have to be in the region of an end section portion, i.e. at the end of a roller track section. Rather, the stop means can also be located in any desired, in particular middle, section portion of the roller track section, if the logistical concept requires it in each case.

In a special embodiment variant, the stop means can be lowered so that the stop means no longer protrudes above the conveying plane but is mounted in a concealed manner. In such an arrangement, the piece goods can roll away unhindered over the stop means without being stopped. Such an embodiment variant is particularly expedient when the stop means does not lie in the region of an end section portion, i.e. at the end of a roller track section, but rather in any other, in particular middle section portion of the roller track section.

Regardless of whether the stop means lies in the region of an end section portion, i.e. at the end of a roller track section or in any other, in particular middle section portion of the roller track section, the item of piece goods, in particular the transport container, can experience a change in position and orientation about a tilting axis by means of the tilting apparatus, which lies at least substantially transversely or at right angles to the conveying direction thereof.

Alternatively, regardless of whether the stop means lies in the region of an end section portion, i.e. at the end of a roller track section or in any other, in particular middle section portion of the roller track section, the item of piece goods, in particular the transport container, can experience a change in position and orientation about a tilting axis by means of the tilting apparatus, which lies at least substantially longitudinally or parallel to the conveying direction thereof. In this alternative embodiment, the item of piece goods, in particular the transport container, is thus inclined laterally away from the roller track.

The predetermined position at which the item of piece goods, in particular the transport container, is stopped by the stop means and tilted there by means of the tilting apparatus, can therefore be in the region of an end section portion, i.e. at the end of a roller track section or in any other, in particular middle section portion of the roller track section.

The tilting apparatus is designed to lift the item of piece goods, in particular the transport container, on one side while maintaining the position and orientation of the load-carrying means, for example rollers of the roller track. The tilting apparatus is designed to tilt the item of piece goods, in particular the transport container, out of the plane of the rollers of the roller track, for example. The rollers of the roller track remain unchanged in their previous positions and orientations during the tilting movement. The conveying plane is determined by the unchanged positions and orientations of the load-carrying means, for example the rollers of the roller track.

By means of the tilting apparatus, the item of piece goods, in particular the transport container, is tilted or pivoted or inclined from a starting position and orientation standing on the conveying plane into an end position and orientation deviating from the starting position and orientation. In this respect, the starting position and orientation corresponds to the conveying plane of the continuous conveyor. In the end position and orientation, the item of piece goods is tilted out of the conveying plane of the continuous conveyor. Tilting or tilting out is understood to mean any type of change in position and orientation of the item of piece goods that is a rotation of the item of piece goods about an axis of rotation that runs at least substantially horizontally. In special embodiments, it is preferably a matter of pivoting the item of piece goods about an axis of rotation running in the conveying direction of the continuous conveyor (X-axis) or pivoting the item of piece goods about an axis of rotation running transversely, i.e. at right angles to the conveying direction of the continuous conveyor, substantially in the conveying plane (Y-axis). The axis of rotation can also be below the conveying plane. The axis of rotation can move, in particular, during the pivoting. Inventively, tilting or tilting out does not mean any rotation of the item of piece goods about a vertical axis of rotation. The tilting or the tilting out can be an inclining, which can optionally take place by raising or lowering an edge, in particular the lower edge, of the item of piece goods. A further lower edge opposite this lower edge can also be raised or lowered in the opposite direction. The lower edge and the further lower edge can be the two opposite front and rear edges of the item of piece goods, or the respective lower, right-side edge and the lower, left-side edge.

Each item of piece goods, which is also referred to as conveyed item, can be, for example, a container, optionally with or without content, an order-picking container (source container, target container), a small parts load carrier (KLT), a package, a tray, a workpiece carrier, a cardboard box, a tray, such as a cardboard carrier, a drum, dimensionally stable and rigid bagged goods and/or other conveyable piece goods such as food.

In the starting position and orientation, the item of piece goods rests with the base thereof on the load-carrying means, in particular on a number of rollers corresponding to the size of the base surface of the item of piece goods, i.e. the item of piece goods rests on a plurality of rollers, for example. In the end position and orientation, the item of piece goods is lifted off of at least a plurality of rollers by means of the tilting apparatus, without the rollers and/or the frame changing the position and orientation thereof. In the end position and orientation, the item of piece goods is supported, for example, only on a single roller and the stop means. Depending on the set height of a contact device of the tilting apparatus, the item of piece goods can be brought into a correspondingly varied tilting angle. The item of piece goods can thus be tilted by means of the tilting apparatus without, for example, the rollers and/or the frame of the continuous conveyor having to be changed in their respective positions and/or orientations. The contact device can be formed, for example, by a rigid rod or a rotatable roller which contacts the item of piece goods on the ground in order to tilt the item of piece goods.

Due to the inventive design of the movement apparatus, in particular the tilting apparatus, the item of piece goods, in particular the transport container, is not ejected from the roller track, but rather remains above the conveying plane of the roller conveyor. The item of piece goods, in particular the transport container, can then be moved back or tilted back to the conveying plane of the roller track in a simple manner by means of the inventive movement apparatus or tilting apparatus and transported further or back by means of the load-carrying means, in particular the roller track.

The movement apparatus can be a tilting apparatus, which can in particular be arranged in a stationary manner with respect to the frame of the roller track and can have an adjustable contact device which is designed to tilt the item of piece goods resting against the stop means from the starting position and orientation thereof into the end position and orientation thereof, the contact device being movably mounted for this purpose so as to be adjustable relative to the load-carrying means with respect to the frame from a storage position into an actuating position. The storage position can be characterized in that the contact device cannot or does not make mechanical contact with the load carried by the load-carrying means. The contact, in particular a direct contact, between the load and the contact device preferably only takes place when the contact device is transferred from the storage position into the actuating position. In the actuating position, in particular direct, mechanical contact is established between the load and the contact device. This means that the elements of the load-carrying means, which support the load while the contact device is in the storage position, are preferably different from the elements of the contact device.

The tilting apparatus can therefore be a handling apparatus connected to the roller track, which is designed to tilt the item of piece goods from the starting position and orientation thereof on the conveying plane of the roller track into the end position and orientation thereof. The adjustable contact device of the tilting apparatus thus forms an end effector which makes contact with the item of piece goods in order to reorient the item of piece goods. The contact device can, for example, grip from below in a lifting manner on a base of the item of piece goods. Alternatively, the contact device can act, for example, in a force-fitting or form-fitting manner on a lateral side wall of the item of piece goods and bring, i.e. pivot, the item of piece goods into the correspondingly desired bearing.

The contact device is mounted so as to be adjustable from a storage position into an actuating position with respect to the frame. The tilting apparatus can accordingly have a drive or a motor which moves and adjusts the contact device relative to the frame and thus relative to the conveying plane.

The tilting apparatus can be designed to tilt the item of piece goods standing on the stop means about a tilting axis that is at least substantially transversely aligned to the conveying direction, in particular longitudinally aligned relative to the axes of rotation of the rollers.

The base portion of the item of piece goods facing away from the stop means can in particular be formed by that base half which is so far away from the side of the stop means with respect to the center of gravity of the item of piece goods, that, in the case of a lifting process of the item of piece goods by the contact device, the lifted item of piece goods tilts forward in the direction of the stop means and not in the opposite direction.

The base of the item of piece goods can thus be divided into the just described base portion facing away from the stop means and a base portion facing the stop means. The base portion facing away and the base portion facing one another can in this respect complement one another to form the entire base surface of the item of piece goods.

The tilting apparatus can alternatively be designed to tilt the item of piece goods standing on the stop means about a tilting axis that is at least substantially longitudinally aligned to the conveying direction, in particular transversely aligned relative to the axes of rotation of the rollers.

In an alternative embodiment, the tilting apparatus can have at least one contact device which is mounted on the frame in a height-adjustable manner, which is designed to lower a base portion of the item of piece goods facing the stop means at least in some portions in order to tilt the item of piece goods into the end position and orientation thereof.

The tilting apparatus can have at least one pivoting means pivotably mounted on the frame, such as a pivoting arm, which has the contact device at the distal pivoting means end thereof, in particular one pivoting arm end of the pivoting arm. The distal pivoting means end can engage in a form-fitting and/or force-fitting manner on the item of piece goods to be tilted or pivoted.

The at least one pivoting arm pivotably mounted on the frame can have the contact device at the distal pivoting arm end thereof. In such an embodiment, the contact device can have, for example, in the form of a pin protruding laterally in the direction of the item of piece goods. During the tilting movement, the laterally projecting pin, in particular two pins engaging on the item of piece goods on opposite lateral sides, engages in a form-fitting manner in one or more corresponding receptacles that are connected to the item of piece goods or the transport container. The receptacles on the item of piece goods can, for example, be designed to be in one piece with the lateral side walls of the item of piece goods, i.e. the transport container.

The pin of the contact device can in this respect form a holding link which is designed to interact in a form-fitting manner during the tilting of the item of piece goods with a receptacle designed as a recess in each case on a lateral side wall of the item of piece goods.

Accordingly, the contact device can have a holding link which is designed to interact in a form-fitting manner during the tilting of the item of piece goods with a projection or a recess on a lateral side wall of the item of piece goods.

In the case of a first embodiment, the drive or motor can be formed by a drum motor or a driven roller or drive roller. This allows the use of standard components from the field of conveyor technology. Accordingly, drum motors, which are also used as driven rollers, for example in conveyance-automated roller tracks, can be used as a motor for actuating the tilting apparatus. In the case of driven rollers, the axis of the drum motor is fixed with respect to the frame and the outer wall of the drum motor, which forms the roller, rotates. In the case of the outer surface of the drum motor, different types of pinions for traction means drives can be fixed and also driven, identical to the outer surface. The contact means is connected to the traction means and is thus also driven by the drum motor. By using the traction means, the rotary movement of the drum motor is converted into a substantially linear movement of the contact means.

Instead of a traction means drive, a combination of racks and pinions can alternatively be used, or pneumatic cylinders or hydraulic cylinders which perform a linear movement. In this respect, powered telescopes can also be used.

In the case of an alternative second embodiment, the drive can be formed by a motor with an intermediate gear. This motor can also be a drum motor. In this embodiment, an additional gear ratio step can be implemented in that the countershaft motor has, for example, a separate drive pinion which drives an output via a second traction means, which drives the first traction means. Instead of a drive pinion having teeth, a belt pulley can also be provided, for example.

In general, the first traction means and/or the second traction means can optionally be designed, for example, as a chain, a toothed belt, V-belt or flat belt. Correspondingly, drive pinions and other gears would have to be replaced by suitable belt pulleys.

The contact device can be formed by a rotatably mounted contact roller which is positioned in the storage position thereof between two adjacent rollers of the roller track below the conveying plane of the rollers or in the conveying plane of the rollers. In an alternative embodiment, the rotatable contact roller can be replaced by a fixed rod, in particular a circular cylinder rod. The fixed rod can, for example, be equipped, in particular be coated, with a friction-reducing sliding material. Even if it can be advantageous if the base of the item of piece goods can roll on a rotatably mounted contact roller during a tilting process, depending on the surface properties of the base of the item of piece goods and/or the outer surface of a fixed rod, in particular a circular cylinder rod, a sliding of the base of the item of piece goods on the outer surface of the stationary, i.e. non-rotating, rod, in particular the circular cylinder rod, will be sufficient and expedient.

The tilting apparatus can have at least one contact device mounted in a height-adjustable manner on the frame, in particular adjustable by the traction means, which is designed to lift a base portion of the item of piece goods facing away from the stop means from below in order to tilt the item of piece goods into the end position and orientation thereof, in particular by means of a left-hand movement means and a right-hand movement means, the left-hand movement means and the right-hand movement means being coupled to one another below the conveying plane. The left-hand movement means is arranged on the one lateral side of the item of piece goods and the right-hand movement means is arranged on a lateral side of the item of piece goods opposite the left movement means. In particular, the left-hand movement means and the right-hand movement means do not grip the item of piece goods from above.

The contact device can be mounted on a traction means of the tilting apparatus in a circumferentially or reversing height-adjustable manner, the traction means being mounted on the frame and driven by a (drum) motor. In general, the traction means can optionally be designed, for example, as a chain, a toothed belt, V-belt, flat belt or rope.

The traction means carries the contact device, for example on two opposite end portions of the contact device. The contact device can be a rotatable or fixed roller, a rod or at least a web-like edge. The contact device is raised or lowered, in that the at least one traction means revolves continuously or in a reversing manner. In order to be able to automatically determine when the contact device is in the storage position or in the actuating position, stops can optionally be provided which stop the contact device mechanically or electronically in the respective storage position or actuating position, or sensors can be provided which detect the current (height) position of the contact device. A control apparatus can be connected to the sensors, which control apparatus controls the drive apparatus of the tilting apparatus as a function of the position of the contact device detected by the sensors in order to automatically bring the contact device into the currently desired position (storage position or actuating position).

In the case of a reversing design of the traction means, mechanical, electro-mechanical or electronic stops can be provided, which the contact device can either strike against a lower stop associated with the storage position or strike against an upper stop associated with the actuating position, depending on the direction of rotation of the traction means.

The tilting apparatus can have at least one contact device mounted in a height-adjustable manner on the frame, in particular adjustable by the traction means, which is designed to bring or to lower a base portion of the item of piece goods facing the stop means in order to tilt the item of piece goods into the end position and orientation thereof.

The contact device can be formed by a fixed rod, in particular a circular cylinder rod or a rotatably mounted contact roller, which is positioned in the storage position thereof, in particular between two adjacent rollers of the roller track below the conveying plane or in the conveying plane.

The contact device can be formed by a support plate which has at least one cutout for one of the rollers of the roller track, the support plate being designed to lift and pivot a base portion of the item of piece goods from below in order to bring or tilt the item of piece goods into the end position and orientation thereof.

The support plate can be designed in such a way that the item of piece goods, in particular the transport container, is not only gripped in places or at points, but is lifted flat on the base thereof and moved along the desired path for tilting. In such an embodiment variant, the item of piece goods, in particular the transport container, does not necessarily have to be rotated about a fixed tilting axis, but can instead perform a different tilting movement along any movement path.

The support plate can have cutouts so that each cutout can be penetrated by a single roller, so that, in the storage position of the support plate, the item of piece goods only stands on the rollers and is no longer in contact with the support plate as such. Accordingly, when the support plate is in the storage position thereof, the item of piece goods, in particular the transport container, can be moved unhindered over the support plate in the conveying direction when the stop means is also moved out of the conveying direction.

The floor-bound continuous conveyor can accordingly be designed as at least one roller conveyor and can have a plurality of rollers rotatably mounted on the frame and arranged side-by-side at a distance from one another as load-carrying means, which form the conveying plane for the piece goods, the conveying direction of which runs at least substantially transversely relative to the axis of rotation of the rollers, the stop means being designed to hold an item of piece goods transported on the conveying plane in the conveying direction at a predetermined position on the rollers, and the tilting apparatus being designed to tilt the item of piece goods resting against the stop means on the conveying plane from the starting position and orientation thereof standing on the conveying plane into an end position and orientation deviating from the starting position and orientation out of the conveying plane of the load-carrying means.

The tilting apparatus can be arranged stationary with respect to the frame of the roller conveyor and the contact device can be movably mounted so as to be adjustable relative to the rollers of the roller conveyor with respect to the frame from a storage position into an actuating position.

The tilting apparatus can also in this case be designed to tilt the item of piece goods standing on the stop means about a tilting axis that is at least substantially longitudinally or transversely aligned relative to the axes of rotation of the rollers.

The contact device can be formed by a support plate which has at least one cutout that is closed or open at the edge for one of the rollers of the roller track, the support plate being designed to lift and pivot a base portion of the item of piece goods from below in order to tilt the item of piece goods into the end position and orientation thereof.

The invention is summarized again in the following, partly in other words.

The conveyance of the conveyed item takes place via a stationary conveying apparatus running substantially horizontally to a target position, for example in the order-picking region. This conveyance is based on the "goods to person" principle.

In particular for the ergonomic provision of the conveyed item, for example a transport container, an adjustment of the position and orientation, i.e. the alignment of the conveyed item, is necessary. For this purpose, the rear edge of the goods to be conveyed, i.e. on a side facing away from the order-picking region, is raised by a substantially vertical portion by means of an end effector, which is moved by means of a lifting apparatus, i.e. the conveyed item is inclined, the pivot point or axis of rotation of the conveyed item preferably being at the lower edge thereof and at a distance, a maximum of half the length of the conveyed item, from the front edge thereof, i.e. the side facing the order-picking region. The front upper edge of the conveyed item changes the position thereof towards the order-picking region and downwards, as a result of which access to the conveyed item is made easier and the ergonomics of the order-picking process are increased.

In one embodiment, the lifting apparatus substantially consists of two mechanically coupled traction means drives that can be driven either directly via a common drive or via a separate back gear. The at least one traction means drive or the two traction means drives move an end effector which is designed to change the position and orientation of the conveyed item, in particular to incline or tilt the conveyed item. The at least one traction means drive required for the stroke can have a drive wheel, a deflection wheel, the traction means itself, and an end effector or some other part for receiving it. The end effector can be fixed in the strand of the traction means, for example by means of a tensioning element. In the first-mentioned variant, the power input and coupling of both drives can be done by a central drum motor, which is equipped with drive wheels on both sides. In the second variant, the mechanical coupling of the two drives can take place according to the same principle, but in this case a non-driven roller is used. This is also equipped with another wheel, which is driven by a drive motor via a countershaft.

As a result, the end effector can perform a substantially vertical translatory (lifting) movement and, in particular, can be positioned steplessly. In order to absorb forces acting transversely to the direction of movement of the traction means, the end effector is mounted in a guided manner. A lifting and/or lowering movement of the end effector can take place either by a complete revolution of the traction means with constant direction of movement/direction of rotation or by a direction reversal with alternately reversed direction of movement. If the latter is the case, the end positions and orientations of the end effector can be selected with the aid of mechanical stops in such a way that mechanical self-locking of the end effector is ensured. Without end stops, the torque required for locking must be generated over the entire period of use by the drive or an additional holding brake on the drive.

In a particularly advantageous embodiment, the end effector represents, in the lower end position and orientation thereof, part of the conveying plane over which the conveyed goods can be moved, i.e. transported and made available. In such a case, the end effector is constantly in contact with the conveyed item.

After completion of the order-picking process, the conveyed item can be lowered back into the horizontal alignment thereof and removed via the same conveying apparatus that was used to supply it.

The inventive conveyance-automated roller track allows an active change in position and orientation of a conveyed item on a conveyor element to be achieved.

The inventive conveyance-automated roller track can serve for the provision of the conveyed item in a defined position and orientation on a conveyor element.

The invention can accordingly ensure an ergonomic provision of conveyed goods for order picking. A cost-effective design can be achieved by using standard components. In this respect, only a very small project-specific adjustment effort is necessary.

Depending on the design, a certain increase in the space utilization can be achieved, since only the conveyed item itself experiences a change in position and orientation and the load-carrying roller track itself does not have to be adjusted, i.e. pivoted or inclined, whereby the required vertical distance between conveying planes arranged one above the other can be reduced if necessary.

The outer shape of the apparatus can be opened on the ceiling side, so that the height of the conveyed item is not restricted and consequently collisions with the surrounding infrastructure can also be avoided.

The inventive apparatus thus serves to actively change the position and orientation of a conveyed item on a stationary conveying apparatus that runs substantially horizontally. A change in position and orientation of the conveyed item can be carried out either by lifting its rear edge (substantially vertically) and/or by lowering its front edge (substantially vertically).

An advantageous drive unit can, for example, be driven directly as a traction means drive, i.e. without an intermediate gear, driven as a traction drive via a countershaft, or as a driven cable pull. A stepless design for individual change in position and orientation due to a change in lift height can be advantageous. A version with two end positions and orientations is also possible.

The displacement of the tilting axis of the item of piece goods takes place advantageously during the displacement of the item of piece goods from the starting position and orientation into the end position and orientation. This can preferably take place in that the point of application between the contact device and the item of piece goods, at which the mechanical contact between the contact device and the item of piece goods takes place, is variable during the displacement. For example, in particular in the event that the contact device is designed as a roller, the contact device can roll or slip relative to the supported base of the item of piece goods. This can be due to the movement of the contact device relative to the frame of the load-carrying means. Furthermore, the item of piece goods can be displaced due to the force of gravity due to the lifting and tilting following the force of gravity. Particularly preferably, it is possible for the item of piece goods to be displaced with the side thereof that is proximal to the stop means into an empty space or gap during tilting, which space or gap extends in particular between the stop means and the load-carrying means.

The empty space or the gap can be static, i.e. independent of the presence of the item of piece goods, or transient, i.e. only limited in time, for example only during tilting, in particular by actuating one or more elements of the load-carrying means. In the case of a static empty space, the item of piece goods is not supported in some regions within the conveying plane between the stop means and the load-carrying means. When tilting by means of the movement apparatus or tilting apparatus, the item of piece goods falls by tilting and/or sliding into the empty space or the gap and the item of piece goods can then be supported below the conveying plane on the floor and/or on a side wall. In the case of a transient empty space, the item of piece goods between the stop means and load-carrying means are supported in some regions in the starting position and orientation within the conveying plane, for example by one or more rollers and/or a plate and/or a belt as preferred load-carrying means. Before or during the tilting, the support of the item of piece goods can be displaced below the conveying plane, for example by displacing the load-carrying means, in particular the at least one roller, and/or the plate and/or the belt, downward or to the side, at least in some regions, so that the empty space is created into which the item of piece goods can be displaced. This displacement of the load-carrying means, in particular the at least one roller, and/or the plate and/or the belt can take place actively or passively. In the case of an active displacement, a drive is provided which allows displacement, so that an empty space can advantageously be predetermined at a predetermined time.

The drive of the contact device can preferably also serve as a drive for the active displacement. In the case of passive displacement, no drive is provided, which advantageously allows a simpler construction of the continuous conveyor. For example, one or more rollers and/or plate(s) and/or belt(s) can be resiliently mounted. During the tilting of the item of piece goods, the rollers can be displaced or pressed downward or below the conveying plane, in particular by the weight of the item of piece goods. The empty space is advantageously created by tilting the item of piece goods itself.

The empty space or the gap can be designed to correspond to approximately 10 percent to approximately 40 percent, preferably approximately 20 percent to approximately 30 percent of the extent of the item of piece goods in the conveying direction. The empty space or the gap can be approximately 10 cm to approximately 40 cm, preferably approximately 15 cm to approximately 30 cm long in the conveying direction. As a result, the center of gravity of the item of piece goods can be displaced downward, so that the center of gravity cannot be raised as high as would be the case by tilting by means of the contact device. The center of gravity in the end position and orientation preferably remains substantially at the height of the center of gravity in the starting position and orientation. The center of gravity of the item of piece goods in the end position and orientation is particularly preferred, however, below the center of gravity in the starting position and orientation.

Advantageously, a combination of tilting by the tilting apparatus and lowering the item of piece goods into an empty space between the stop means and the load-carrying means results in the opening inclining towards a user and thus the user having better access to the item of piece goods and, moreover, the necessary space in the vertical is reduced.

One aspect relates to a system comprising:
at least one first inventive floor-bound continuous conveyor and
at least one second floor-bound continuous conveyor, preferably according to the invention, which is arranged at least in some regions below the first continuous conveyor.

The advantageous arrangement of two (inventive) continuous conveyors arranged vertically one above the other allows the user to access two items of piece goods that have been provided at the same time.

In the case of the first and/or second continuous conveyor, the feed and discharge can take place via the same conveyor technology. In particular, there is no (automatic) conveyance of an item of piece goods from the first to the second (or vice versa) continuous conveyor. The second continuous conveyor can in particular be substantially horizontally aligned and in particular have a roller conveyor.

The second continuous conveyor preferably protrudes toward the user with respect to the first continuous conveyor, preferably by more than approximately 5 cm, particularly preferably by more than approximately 10 cm and in particular by more than approximately 15 cm. This advantageously gives the user better access to the item of piece goods provided to the second, lower continuous conveyor. Specific embodiments of the invention are explained in more detail in the following descriptions with reference to the accompanying figures. Specific features of these embodiments, possibly considered individually or in further combinations, can represent general features of the invention regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
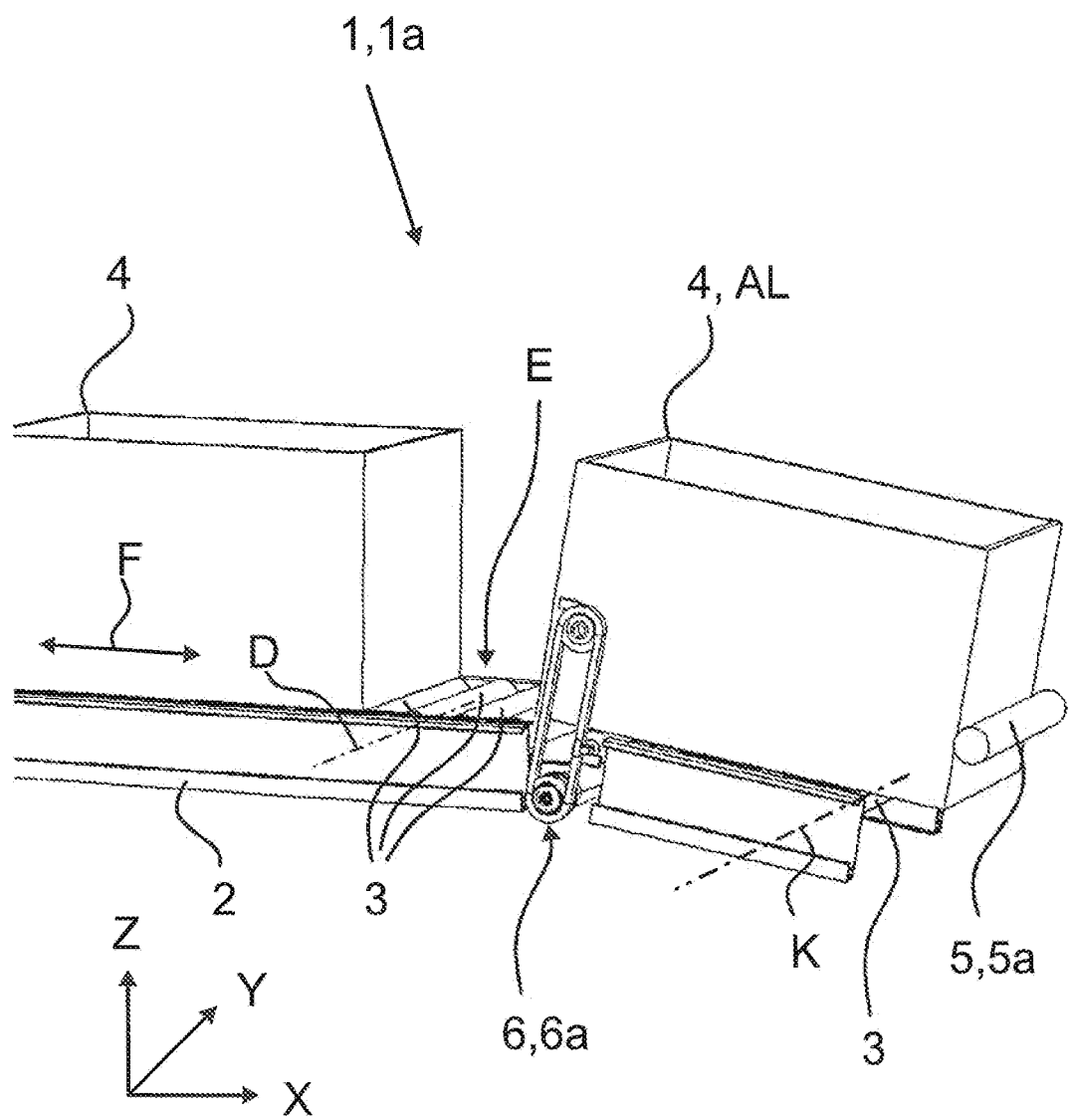
FIG. 1 is a perspective view of an exemplary conveyance-automated roller track with a stop means and a tilting apparatus for an item of piece goods in the form of a transport container in the starting position and orientation.

The conveyance-automated roller track 1a shown in FIG. 1 as a specific example of an inventive floor-bound continuous conveyor 1 has at least one frame 2 and a plurality of rollers 3 rotatably mounted on the frame 2 and arranged side-by-side at a distance from one another. The rollers 3 form a conveying plane E for piece goods 4. The conveying direction F of the rollers 3 runs at least substantially transversely to the axis of rotation D of the rollers 3. In the case of the present embodiment, the piece goods 4 are designed as transport containers in which, in turn, other piece goods or goods or objects, for example grouped according to type, can be transported.

The conveyance-automated roller track 1a has a stop means 5 which is designed to stop an item of piece goods 4 transported on the conveying plane E in the conveying direction F at a predetermined position on the roller conveyor 1a. As shown in FIG. 1, the stop means 5 can be formed by a stationary or rotatably mounted stop roller 5a. The stop means 5 or the stop roller 5a can be lifted out from the conveying plane E in order, as shown in FIG. 1, to have the stop effect.

The conveyance-automated roller track 1a also has a movement apparatus 6 which, in the case of the present embodiment, is designed as a tilting apparatus 6a in the special embodiment, which is designed to tilt the item of piece goods 4 resting against the stop means 5 on the conveying plane E from the starting position and orientation AL (FIG. 1) thereof standing on the conveying plane E into an end position and orientation EL (FIG. 2) deviating from the starting position and orientation AL out of the conveying plane E of the roller track 1a.

In the starting position and orientation AL, the item of piece goods 4 rests with the base wall thereof on a number of rollers 3 corresponding to the size of the base surface of the item of piece goods 4, i.e. the item of piece goods 4 rests flat on the plurality of rollers 3. In the end position and orientation EL, the item of piece goods 4 is lifted off of at least a plurality of rollers 3 by means of the tilting apparatus 6a, without the rollers 3 and/or the frame 2 changing the position and orientation thereof. In the end position and orientation EL according to FIG. 2, the item of piece goods 4 is supported only on a single roller of the rollers 3 and on the stop means 5 or the stop roller 5a. Depending on the set height of the tilting apparatus 6a, the item of piece goods 4 can be brought into a correspondingly varied tilting angle. The item of piece goods 4 can be tilted by means of the tilting apparatus 6a without the rollers 3 and/or the frame 2 of the conveyance-automated roller track 1a having to be changed in their respective positions and/or orientations.

The tilting apparatus 6a is arranged in a stationary manner with respect to the frame 2 of the roller track 1a. However, as shown in particular in FIGS. 3 and 4, the tilting apparatus 6a has an adjustable contact device 7 which is designed to tilt the item of piece goods 4 resting against the stop means 5 from the starting position and orientation AL thereof into the end position and orientation EL thereof, the contact device 7 being mounted for this purpose so as to be adjustable with respect to the frame 2 from a storage position VP (FIG. 3) into an actuating position BP (FIG. 4). In the storage position VP, the contact device 7 is at least substantially in the conveying plane E, i.e. the contact device 7 is at least approximately at the height of the rollers 3, or does not protrude upward above the rollers 3. This can be seen in particular in FIG. 1.

The tilting apparatus 6a is designed to tilt the item of piece goods 4 standing on the stop means 5 about a tilting axis K (FIG. 1) that is at least substantially longitudinally aligned relative to the axes of rotation D (FIG. 1) of the rollers 3. The tilting direction of the piece goods 4 runs in the conveying direction of the conveyance-automated roller track 1a.

The tilting apparatus 6a according to the embodiments according to FIGS. 1 to 7 has at least one contact device 7 which is mounted on the frame 2 in a height-adjustable manner, which is designed to lift a base portion BA1 of the item of piece goods 4 facing away from the stop means 5 from below in order to tilt the item of piece goods 4 into the end position and orientation EL thereof. The base portion BA1 of the item of piece goods 4 facing away from the stop means 5 is formed by that base half which is so far away from the side of the stop means 5 with respect to the center of gravity of the item of piece goods 4 that, in the case of a lifting process of the item of piece goods 4 by the contact device 7, the lifted item of piece goods 4 tilts forward in the direction of the stop means 5 and not in the opposite direction.

The base of the item of piece goods 4 can be divided into the just described base portion BA1 facing away from the stop means 5 and a base portion BA2 facing the stop means 5. The base portion BA1 and the base portion BA2 can in this respect complement each other to form the entire base surface of the item of piece goods 4 (FIG. 2).

Figure 5:
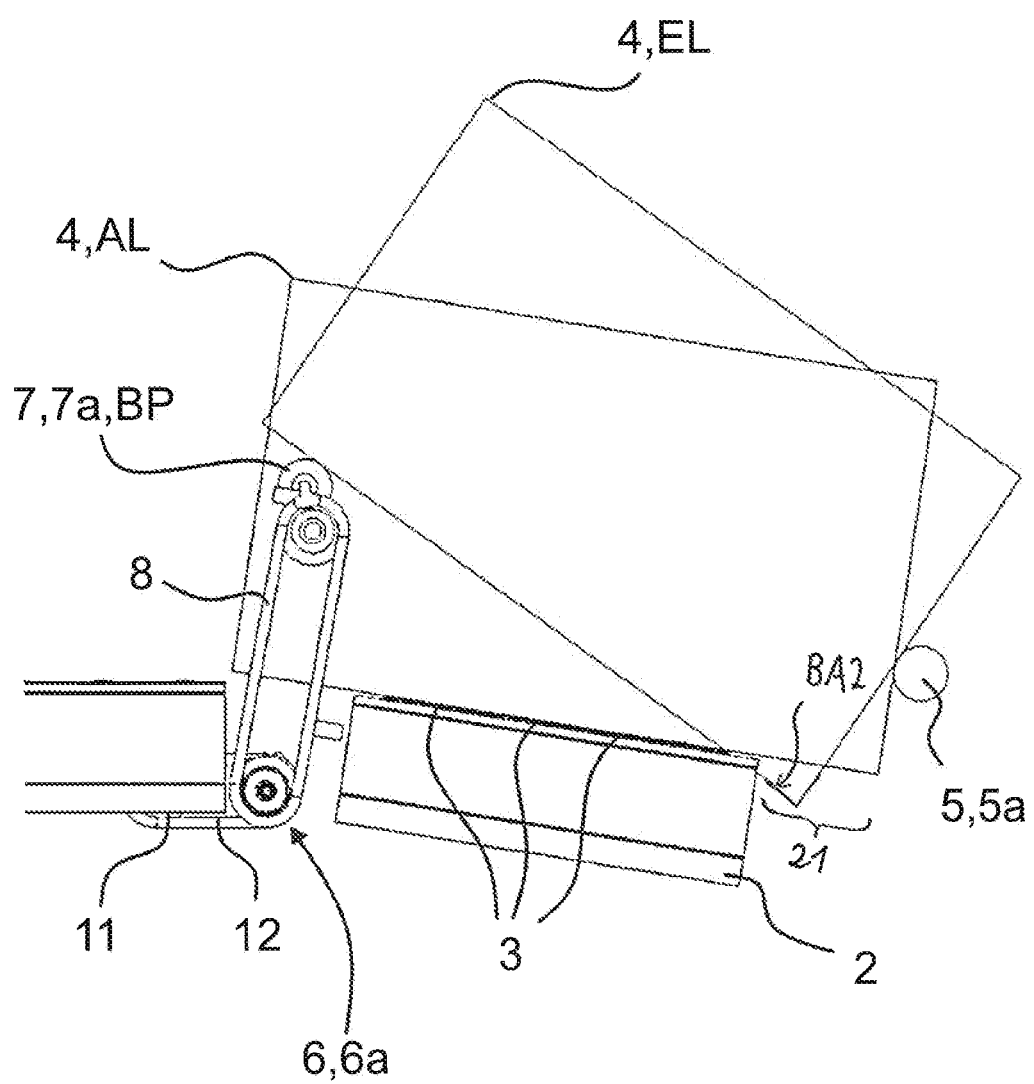
FIG. 5 is a side view of a second embodiment of a tilting apparatus with a back gear and a traction means drive.

The tilting apparatus 6a can accordingly have at least one contact device 7, which is mounted on the frame 2 in a height-adjustable manner, which is designed to lower a base portion BA2 of the item of piece goods 4 facing the stop means 5 at least in some portions in order to tilt the item of piece goods 4 into the end position and orientation EL thereof, as shown in particular in FIG. 5.

FIG. 5 shows that the item of piece goods is displaced with the side (BA2) thereof that is proximal to the stop means into an empty space (21) or a gap during tilting, which space or gap extends in particular between the stop means 5 and the load-carrying means 3. As a result, the item of piece goods is lowered advantageously vertically downward in the position thereof.

Figure 2:
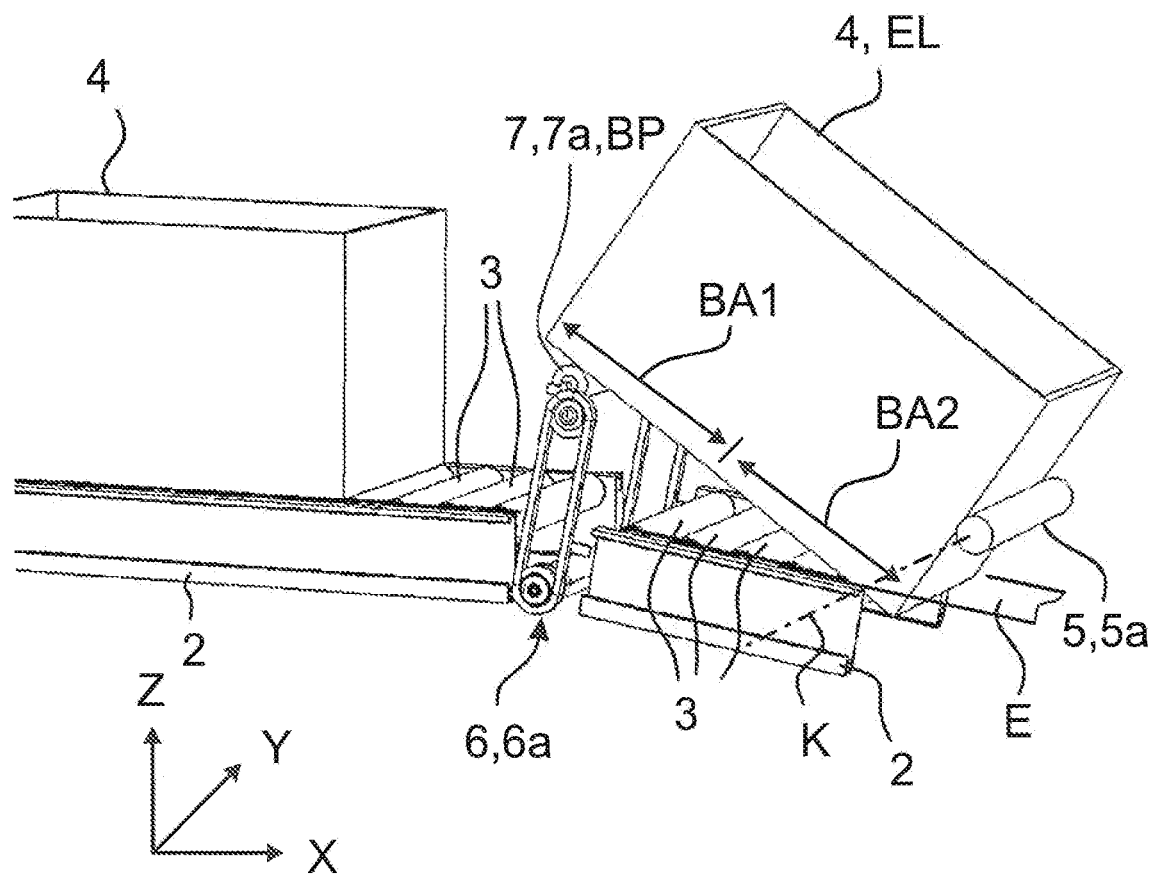
FIG. 2 is a perspective view of the roller track of FIG. 1 with the transport container in the end position and orientation.
Figure 8:
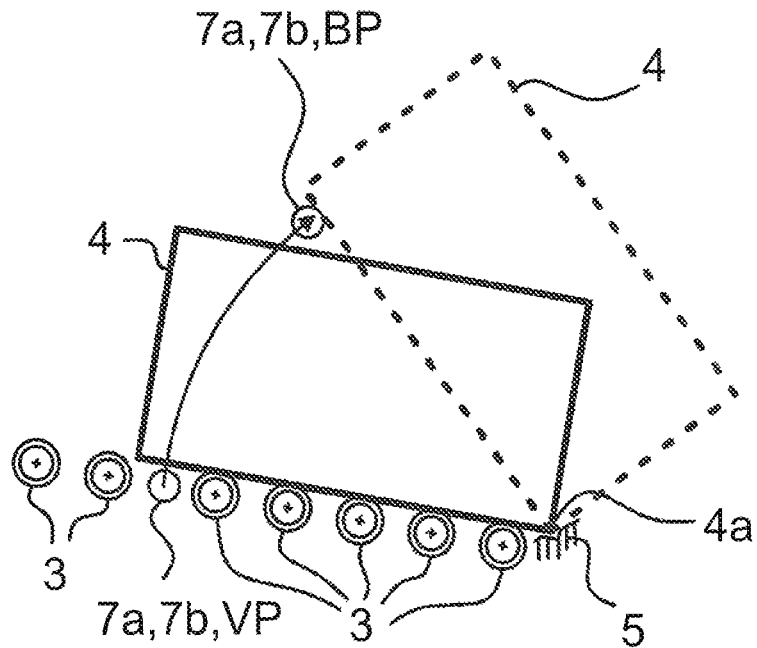
FIG. 8 is a schematic view of a first variant of an exemplary tilting process by means of the tilting apparatus on an item of piece goods in the form of a transport container with a pivot point on the lower front edge of the transport container.
Figure 9:
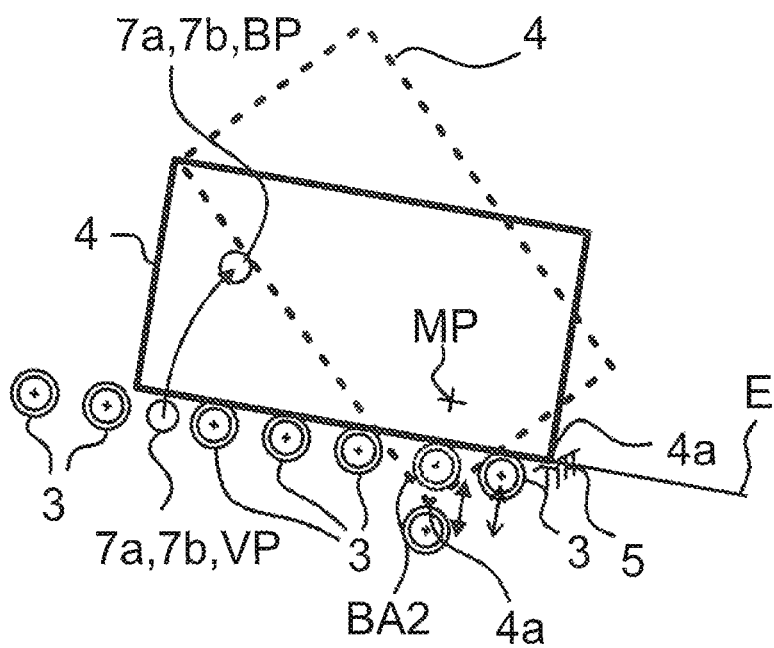
FIG. 9 is a schematic view of a second variant of a tipping process by means of the tilting apparatus on an item of piece goods in the form of a transport container with a pivot point within the transport container.

Such an at least partial lowering of the base portion BA2 is already shown to a slight extent in FIG. 2. Such a lowering of the base portion BA2 is shown particularly clearly in the embodiment variant according to FIG. 9. There, the item of piece goods 4 does not carry out a pivoting movement about the front lower corner 4a thereof, as shown, for example, in FIG. 8, but rather about an instantaneous pole MP, which lies within the volume of the item of piece goods 4, as shown in FIG. 9. In this case of FIG. 9, the front lower corner 4a accordingly plunges below the conveying plane E, so that the base portion BA2 of the item of piece goods 4 facing the stop means 5 is lowered at least in portions. In the embodiment according to FIG. 9, the stop means 5 or the stop roller 5a can optionally also be formed by one of the rollers 3. One or more of the rollers 3 is preferably designed to be displaceable relative to the other rollers 3. The roller closest to the stop means 5 is shown in the starting position thereof again after a displacement and supports a side wall of the item of piece goods 4. The, in particular linear, displacement can preferably take place in a direction substantially perpendicular to the conveying plane E. For this purpose, one or more of the rollers 3 can be arranged to be displaceable, in particular by means of an associated drive.

As shown in the embodiments according to FIGS. 3, 4, 6 and 7, the contact device 7 can be mounted on a first traction means 8 of the tilting apparatus 6a in a circumferentially or reversing height-adjustable manner, the traction means 8 being mounted on the frame 2 and driven by a motor 9.

Figure 3:
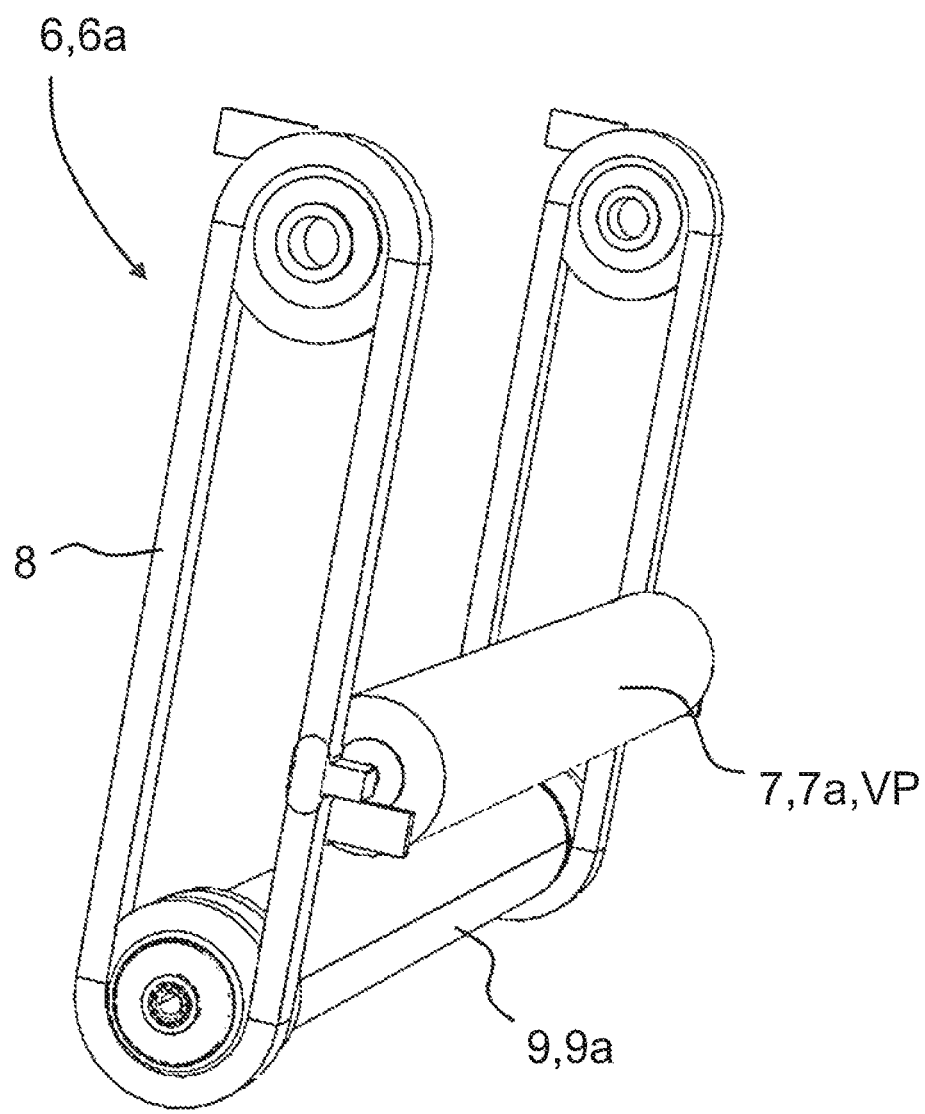
FIG. 3 is a perspective view of the tilting apparatus with the direct drive motor and a traction means drive in isolation with a contact roller in the storage position thereof.
Figure 4:
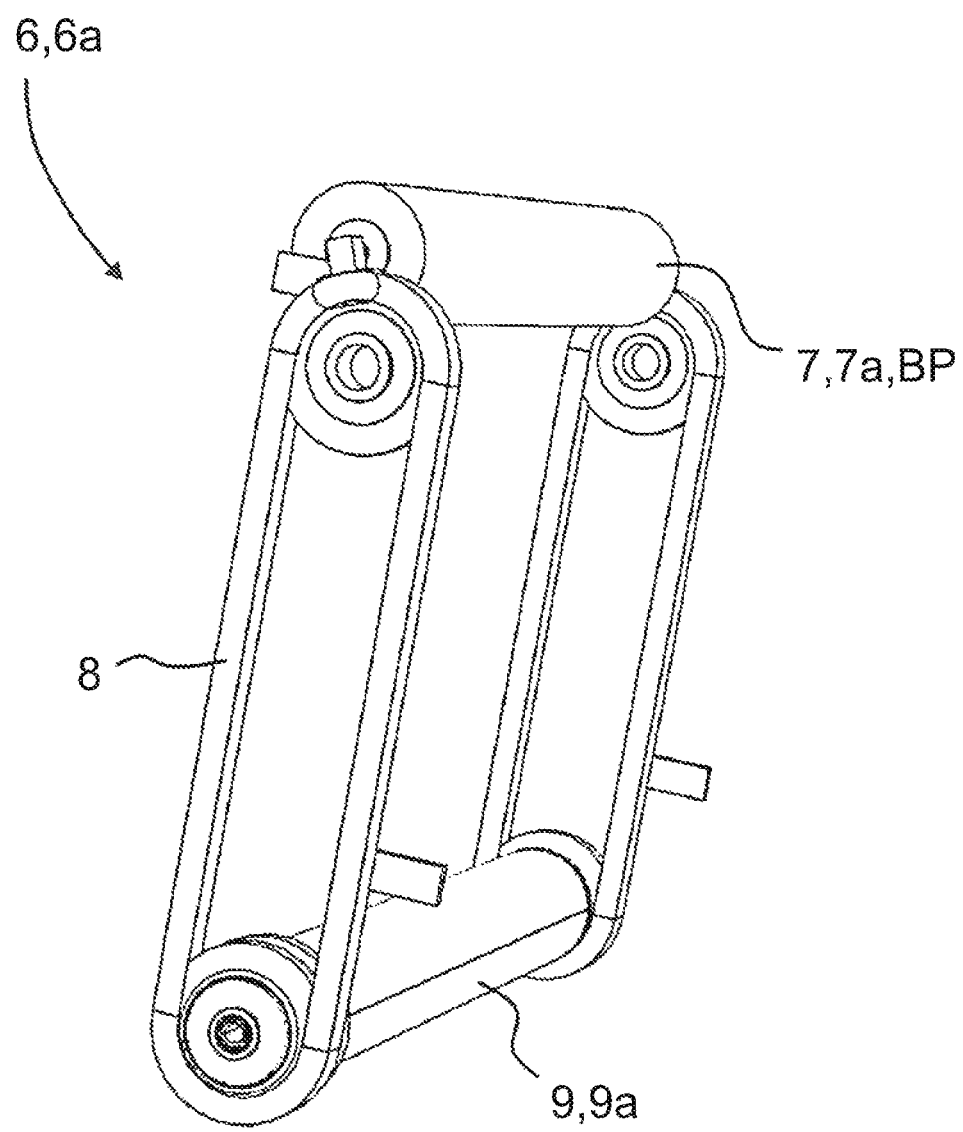
FIG. 4 is a perspective view of the tilting apparatus of FIG. 3 with the contact roller in the actuating position thereof.

In the case of the embodiment according to FIGS. 3 and 4, the motor 9 is formed by a drum motor 9a. This allows the use of identical parts. Accordingly, drum motors, which are also used as driven rollers 3 of the conveyance-automated roller track 1*a*, can be used as a motor 9 for actuating the tilting apparatus 6*a*. In the case of driven rollers 3, the axis of the drum motor 9*a* is fixed with respect to the frame 2 and the outer wall of the drum motor 9*a*, which forms the roller 3, rotates.

Figure 6:
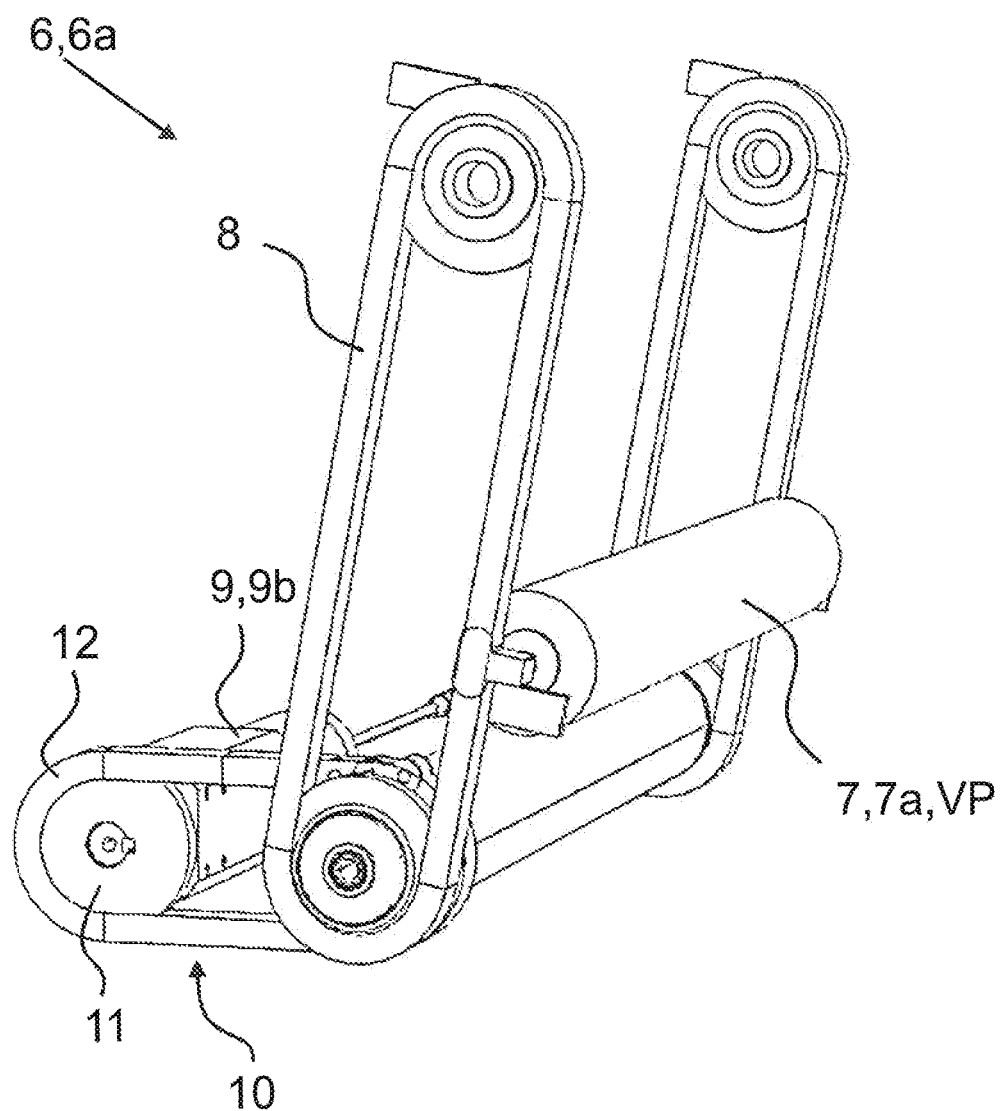
FIG. 6 is a perspective view of the tilting apparatus with the back gear and the traction means drive of FIG. 5 in isolation and with the contact roller in the storage position thereof.
Figure 7:
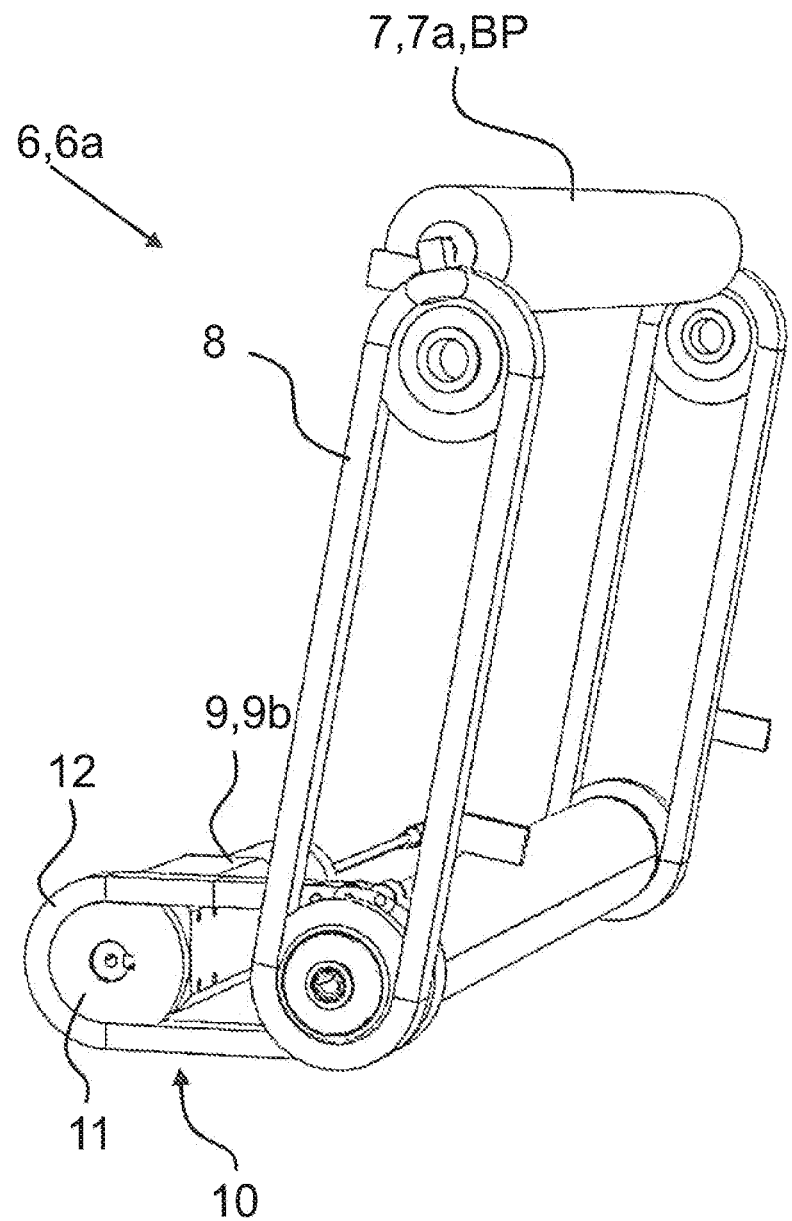
FIG. 7 is a perspective view of the tilting apparatus with the back gear and the traction means drive of FIG. 5 in isolation and with the contact roller in the actuating position thereof.

In the case of the embodiment according to FIGS. 6 and 7, the motor 9 is formed by a countershaft motor 9*b*. In the embodiment as a countershaft motor 9*b*, an additional gear ratio step 10 can be implemented in which the shaft of the countershaft motor 9*b* has a separate drive pinion 11 which drives an output 13 via a second traction means 12, which drives the first traction means 8. Instead of a drive pinion 11 having teeth, a belt pulley (not shown) can also be provided, for example.

In general, the first traction means 8 and/or the second traction means 12 can optionally be designed, for example, as a chain, a toothed belt, V-belt or flat belt. Correspondingly, the drive pinions 11 and other gears shown in FIGS. 1 to 7 are to be replaced by suitable belt pulleys.

The contact device 7 can, as shown in FIG. 1 to FIG. 7, be formed by a rotatably mounted contact roller 7*a*, which is positioned in the storage position VP thereof between two adjacent rollers 3 of the roller track 1*a* below the conveying plane E of the rollers 3 or in the conveying plane E of the rollers 3, as can be seen in particular in FIG. 1. In an alternative embodiment, the rotatable contact roller 7*a* shown in FIGS. 1 to 5 can be replaced by a fixed rod, in particular a circular cylinder rod 7*b*, as is indicated in FIGS. 8 and 9, for example. Even if it can be advantageous if the base of the item of piece goods 4 can roll on a rotatably mounted contact roller 7*a* during a tilting process, depending on the surface properties of the base of the item of piece goods 4 and/or the outer surface of a fixed rod, in particular a circular cylinder rod 7*b*, a sliding of the base of the item of piece goods 4 on the outer surface of the stationary, i.e. non-rotating, rod or the circular cylinder rod 7*b* will be sufficient and expedient.

Figure 10:
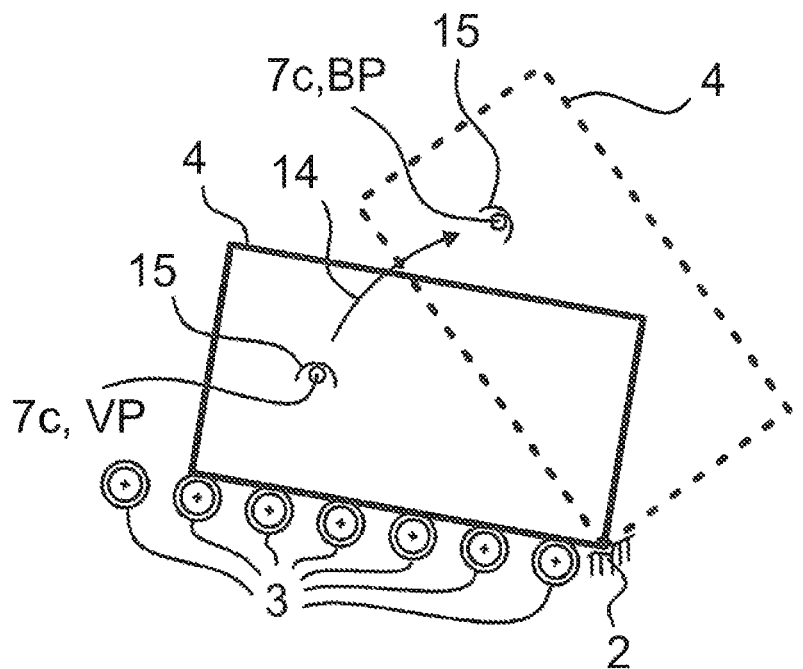
FIG. 10 is a schematic view of an alternative embodiment of a tilting apparatus, which has at least one pivoting means movably mounted on the frame.
Figure 11:
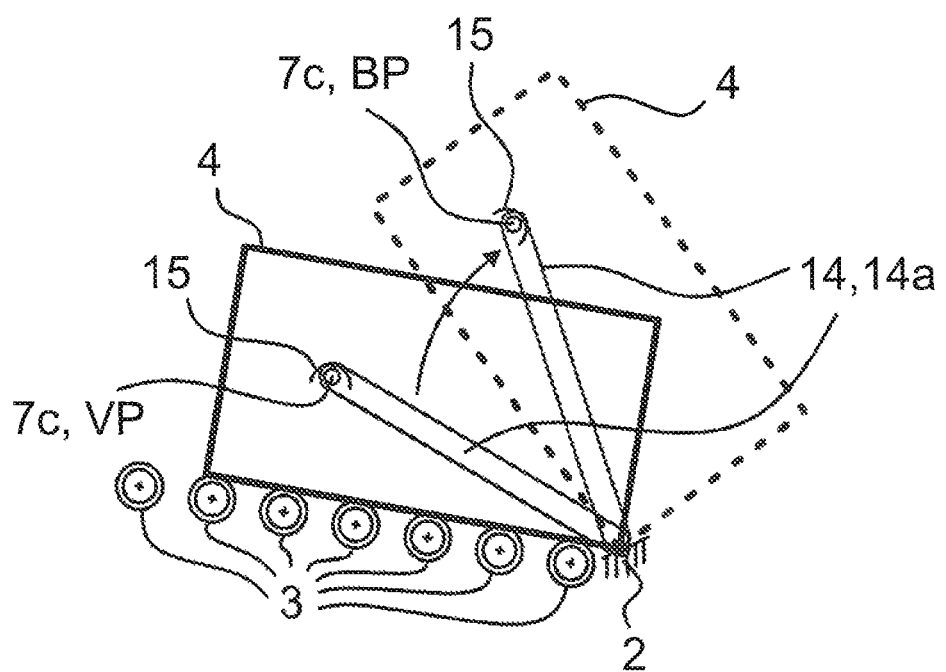
FIG. 11 is a schematic view of an alternative embodiment of a tilting apparatus which has at least one pivoting arm pivotably mounted on the frame as a pivoting means, which has the contact device at the distal end pivoting arm end.

In an alternative embodiment, instead of a traction means 8, the tilting apparatus 6*a* can have at least one pivoting means 14 (FIG. 10) pivotably mounted on the frame 2, in particular a pivoting arm 14*a* (FIG. 11) which has the contact device 7 at the distal pivoting arm end thereof in the form of a pin 7*c* protruding laterally in the direction of the item of piece goods 4. During the tilting movement, the laterally projecting pin 7*c*, in particular two on opposite lateral sides, engages in a form-fitting manner on the item of piece goods 4 in one or more corresponding receptacles 15 which are connected to the item of piece goods 4. The receptacles 15 on the item of piece goods 4 can, for example, be designed to be in one piece with the lateral side walls of the item of piece goods 4.

The pin 7*c* of the contact device 7 can in this respect form a holding link which is designed to interact in a form-fitting manner during the tilting of the item of piece goods 4 with a receptacle 15 designed as a recess in each case on a lateral side wall of the item of piece goods 4.

Figure 12:
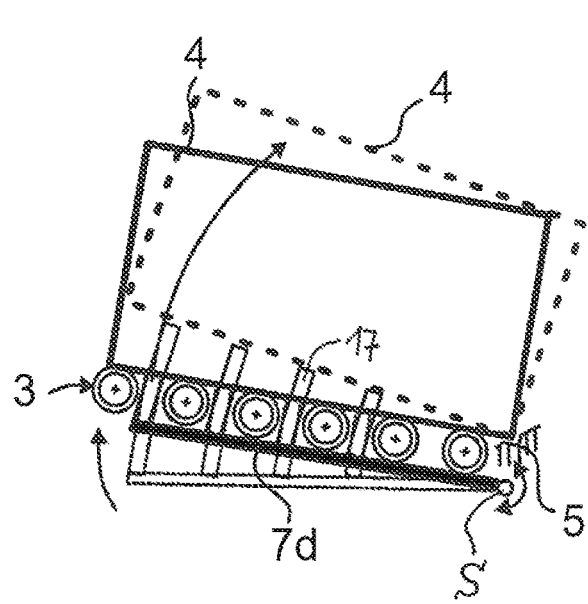
FIG. 12 is a schematic view of a modified embodiment of a tilting apparatus, which comprises a support plate with edge-closed cutouts for rollers of the roller track, for pivoting the support plate about a pivot axis running parallel to the axes of rotation of the rollers.
Figure 13:
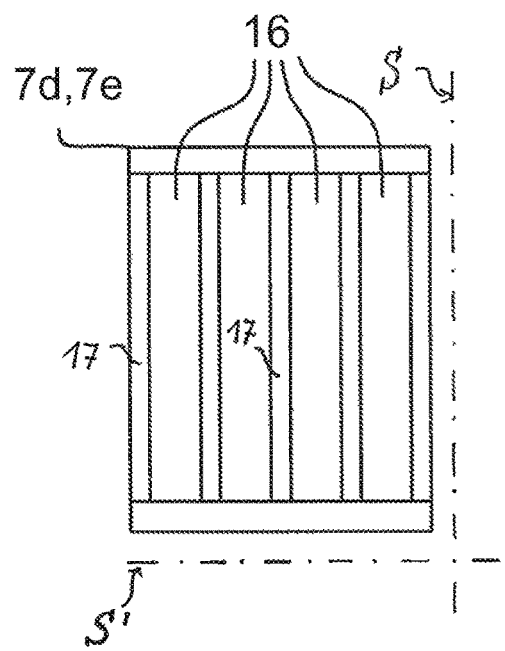
FIG. 13 is a schematic view of the support plate of FIG. 12 in isolation in a view from above.
Figure 15:
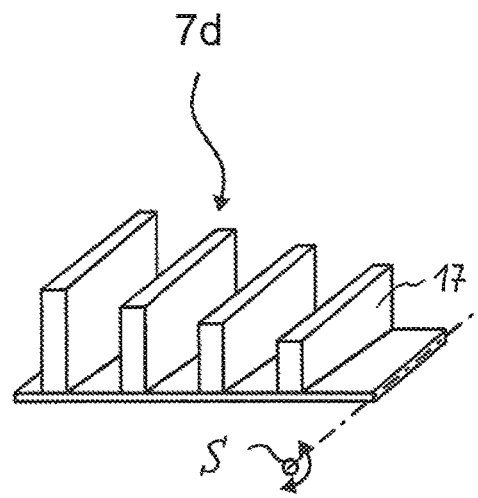
FIG. 15 is a schematic perspective view of the support device of FIGS. 12 and 13 with four strip-like or comb-like elevations.

In a further embodiment variant according to FIGS. 12, 13 and 15, the contact device 7 can be formed by a first support device 7*d*, which has, for example, a plurality of cutouts 16 or a plurality of strip-like or comb-like elevations 17 as a preferred contour element 17, from which, in each case, one protrudes movably between two rollers 3 of the roller track 1*a*, as can be seen in particular in FIG. 12 and FIG. 15, the support device 7*d* or the strip-like or comb-like elevations thereof being designed to lift and pivot a base portion of the item of piece goods 4 from below in order to tilt the item of piece goods 4 into the end position and orientation EL thereof, as illustrated in FIG. 12. FIG. 13 shows the support device 7*d* in a top view on its own having five contour elements 17 between which four cutouts 16 are arranged, one roller 3 each being assignable to one of the cutouts 16. In this embodiment variant, the support device 7*d* is designed to pivot about a pivot axis S running parallel to the axes of rotation of the rollers 3. FIG. 15 shows the support device 7*d* in a schematic perspective view with the four strip-like or comb-like elevations thereof.

Figure 14:
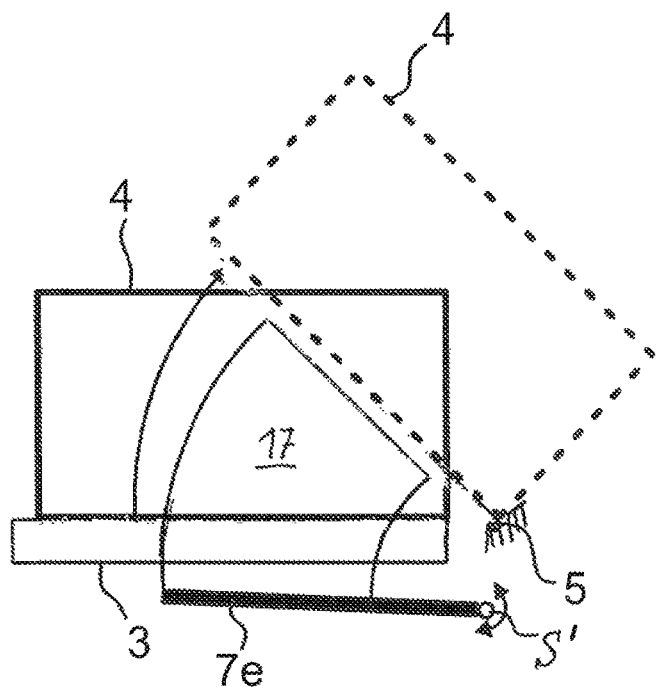
FIG. 14 is a schematic view of a modified embodiment of a tilting apparatus, which comprises a comb-like support plate, for pivoting the comb-like support plate about a pivot axis running at right angles to the axes of rotation of the rollers.

In a further embodiment variant according to FIG. 14, the contact device 7 can be formed by a comb-like second support device 7*e*, which has, for example, a plurality of combs 17 aligned parallel to one another and spaced apart from one another as preferred contour elements 17. In this embodiment variant, the comb-like support device 7*e* is designed to pivot about a pivot axis SC running at right angles to the axes of rotation of the rollers 3, as is also shown in FIG. 13. FIG. 13 shows that the pivot axis S is oriented substantially orthogonally to the pivot axis Sc.

Figure 16:
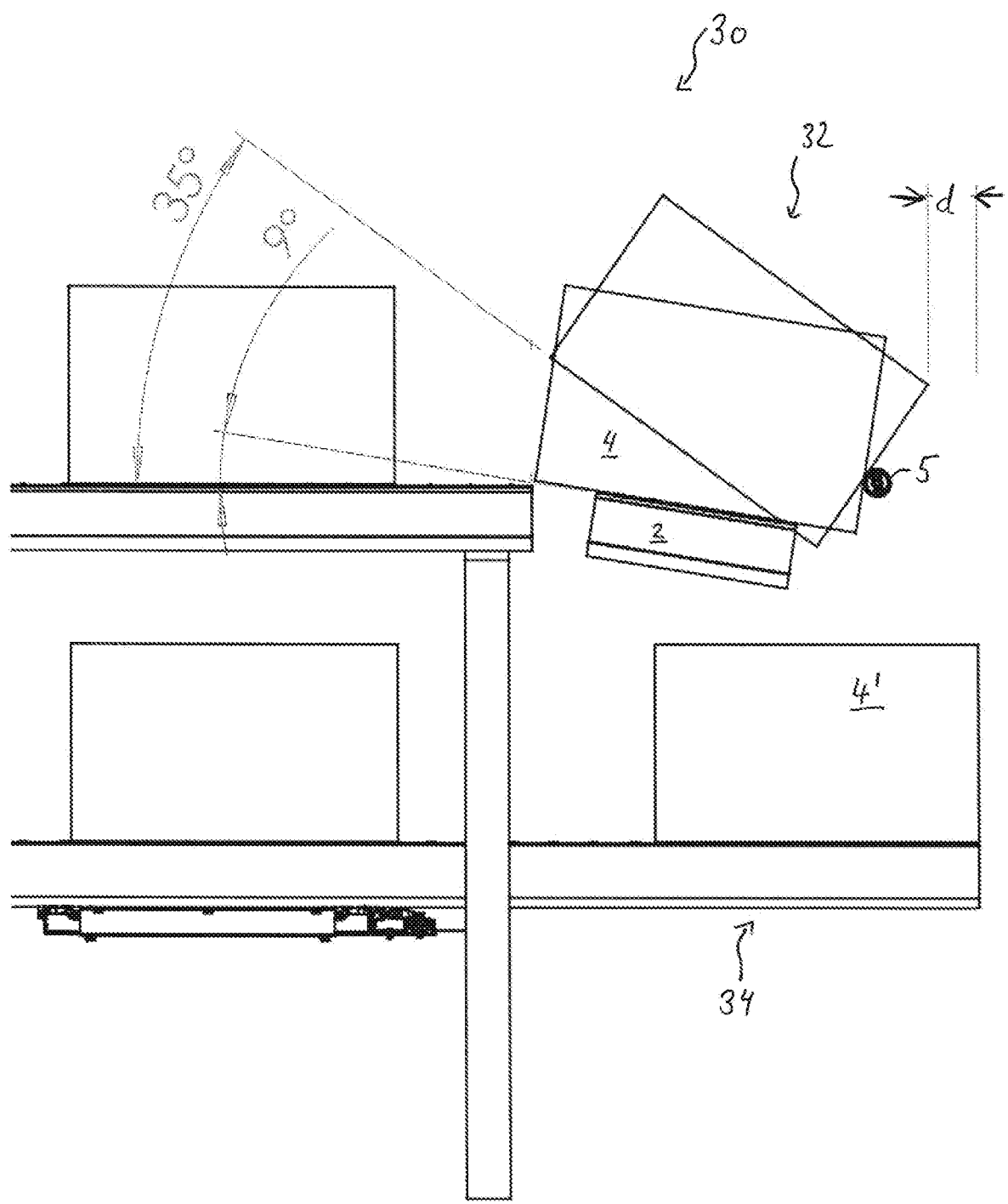
FIG. 16 is a schematic side view of a system of two continuous conveyors.

FIG. 16 shows a system 30 having a first inventive floor-bound continuous conveyor 32 and a second continuous conveyor 34 arranged below the first ascending conveyor 32. The elements, in particular of the first continuous conveyor, which have already been described in the previous figures and are identical thereto, are identified in FIG. 16 with identical reference signs.

In this embodiment, the frame 2 having the load-carrying means 3 of the first continuous conveyor is inclined towards the user by approximately 9 degrees relative to the horizontal. In the end position and orientation, the item of piece goods 4 in this embodiment is tilted toward the user by approximately 35 degrees relative to the horizontal. In contrast, the second continuous conveyor is oriented horizontally and the item of piece goods 4 is not tilted. The user still has access to the item of piece goods, since the second continuous conveyor is arranged below the first continuous conveyor 32 in such a way that the second continuous conveyor 32 or the item of piece goods 4' provided thereon protrudes by a distance d towards the user with respect to the first continuous conveyor 32, or the item of piece goods 4 provided thereon protrudes by a distance d towards the user. This protrusion d is sufficiently dimensioned such that the user can grip at least one item from the piece goods 4 and place it into the piece goods 4'.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A floor-bound continuous conveyor for intralogistics, comprising:
   at least one frame rigidly connected to the ground;
   at least one load-carrying means supported on the frame, the load-carrying means defining a conveying plane for piece goods and which is configured to transport the piece goods in a conveying direction;

a stop means configured to stop an item of piece goods transported on the conveying plane in the conveying direction at a predetermined position on the load-carrying means; and a movement apparatus configured to move the item of piece goods resting against the stop means on the conveying plane from a starting position and orientation supported on the conveying plane of the load-carrying means into an end position and orientation differing from the starting position and orientation, which end position and orientation is out of the conveying plane;

wherein the movement apparatus is configured as a tilting apparatus which is arranged stationary with respect to the frame and has an adjustable contact device configured to tilt the item of piece goods resting against the stop means from the starting position and orientation into the end position and orientation;

wherein the contact device is movably mounted with respect to the frame for tilting the item of piece goods so as to be adjustable relative to the load-carrying means from a storage position into an actuating position;

wherein the contact device is mounted on a traction means of the movement apparatus;

the contact device is mounted for movement along the traction means in a circumferential or a reversable height-adjustable manner; and the traction means is mounted on the frame and is driven by a motor.

2. The floor-bound continuous conveyor of claim 1, wherein:
the at least one load-carrying means comprises at least one of:
at least one roller conveyor,
at least one belt conveyor,
at least one chain conveyor,
at least one vibratory conveyor, or
at least one chute; and
the conveying plane is arranged at least substantially horizontally or so as to be inclined at an angle of up to 15 degrees from horizontal.

3. The floor-bound continuous conveyor of claim 1, wherein the movement apparatus is configured to automatically tilt the item of piece goods resting against the stop means about a tilting axis which is at least substantially longitudinally aligned relative to the conveying direction.

4. The floor-bound continuous conveyor of claim 1, wherein the movement apparatus is configured to automatically tilt the item of piece goods resting against the stop means about a tilting axis which is at least substantially transversely aligned relative to the conveying direction.

5. The floor-bound continuous conveyor of claim 1, further comprising:
a sensor configured to detect an item of piece goods resting against the stop means;
wherein the movement apparatus is configured to automatically tilt the item of piece goods from the starting position and orientation into the end position and orientation in response to detection an item of piece goods resting against the stop means.

6. The floor-bound continuous conveyor of claim 1, wherein the continuous conveyor is configured such that a tilting axis of the item of piece goods is displaceable during the movement of the item of piece goods from the starting position and orientation into the end position and orientation.

7. The floor-bound continuous conveyor of claim 1, further comprising:
an empty space extending between the stop means and the load-carrying means;
wherein the item of piece goods is displaceable with a side thereof that is proximate the stop means into the empty space during a tilting movement of the item of piece goods from the starting position and orientation into the end position and orientation.

8. The floor-bound continuous conveyor of claim 1, wherein:
the movement apparatus has at least one of:
at least one contact device mounted on the frame in a height-adjustable manner, or
at least one load-carrying means mounted in a height-adjustable manner;
the at least one contact device or load-carrying means configured to lower a base portion of the item of piece goods facing the stop means in order to tilt the item of piece goods into the end position and orientation thereof.

9. The floor-bound continuous conveyor of claim 1, wherein the contact device is formed by:
a fixed rod; or
a rotatably mounted contact roller positioned in a storage position below the conveying plane or in the conveying plane.

10. The floor-bound continuous conveyor of claim 9, wherein:
the fixed rod is a circular cylinder rod; or
the contact roller is a driven roller.

11. The floor-bound continuous conveyor of claim 1, wherein:
the floor-bound continuous conveyor is configured as at least one roller conveyor;
the at least one load-carrying means comprises a plurality of rollers rotatably mounted on the frame and arranged side-by-side at a distance from one another to form the conveying plane for the piece goods;
the conveying direction of the load-carrying means runs at least substantially transversely relative to axes of rotation of the rollers; and
the stop means is configured to hold an item of piece goods transported on the conveying plane in the conveying direction at a predetermined position on the rollers.

12. The floor-bound continuous conveyor of claim 11, wherein:
the contact device is movably mounted so as to be adjustable relative to the rollers of the roller conveyor with respect to the frame from a storage position, wherein the contact device does not make mechanical contact with the load, into an actuating position, wherein mechanical contact is established between the load and the contact device.

13. The floor-bound continuous of claim 11, wherein:
the tilting apparatus is configured to tilt the item of piece goods resting against the stop means about a tilting axis which is at least substantially longitudinally or transversely aligned relative to the axes of rotation of the rollers.

14. A conveyor system, comprising:
at least one first, floor-bound continuous conveyor according to claim 1; and
at least one second, floor-bound continuous conveyor arranged, at least in some regions, below the at least one first, floor-bound continuous conveyor.

15. The conveyor system of claim 14, wherein the at least one second floor-bound continuous conveyor is configured the same as the first, floor-bound continuous conveyor.

16. A floor-bound continuous conveyor for intralogistics, comprising:
- at least one frame rigidly connected to the ground;
- at least one load-carrying means supported on the frame, the load-carrying means defining a conveying plane for piece goods and which is configured to transport the piece goods in a conveying direction;
- a stop means configured to stop an item of piece goods transported on the conveying plane in the conveying direction at a predetermined position on the load-carrying means; and
- a movement apparatus configured to move the item of piece goods resting against the stop means on the conveying plane from a starting position and orientation supported on the conveying plane of the load-carrying means into an end position and orientation differing from the starting position and orientation, which end position and orientation is out of the conveying plane;
- wherein the movement apparatus is configured as a tilting apparatus which is arranged stationary with respect to the frame and has an adjustable contact device configured to tilt the item of piece goods resting against the stop means from the starting position and orientation into the end position and orientation;
- wherein the contact device is movably mounted with respect to the frame for tilting the item of piece goods so as to be adjustable relative to the load-carrying means from a storage position into an actuating position;
- wherein the floor-bound continuous conveyor is configured as at least one roller conveyor;
- wherein the at least one load-carrying means comprises a plurality of rollers rotatably mounted on the frame and arranged side-by-side at a distance from one another to form the conveying plane for the piece goods;
- wherein the conveying direction of the load-carrying means runs at least substantially transversely relative to axes of rotation of the rollers;
- wherein the stop means is configured to hold an item of piece goods transported on the conveying plane in the conveying direction at a predetermined position on the rollers:
- wherein the contact device comprises a support plate which has at least one cutout for one of the rollers of the roller conveyor; and
- the support plate is configured to lift and pivot a base portion of the item of piece goods from below in order to tilt the item of piece goods into the end position and orientation.

* * * * *